Patented Sept. 15, 1953

2,652,378

UNITED STATES PATENT OFFICE 2,652,378

MIXTURES COMPRISING ACRYLONITRILE POLYMERS AND VINYL ACETATE-FUMARIC AMIDE INTERPOLYMERS

John R. Caldwell, Kingsport, Tenn., assignor to Eastman Kodak Company, Rochester, N. Y., a corporation of New Jersey No Drawing. Application May 3, 1951, Serial No. 224,447

16 Claims. (Cl. 260—30.4)

This invention relates to composite, resinous compositions comprising mixtures of polyacrylonitrile and interpolymers of fumaric amide or N-substituted fumaric amides with vinyl acetate, and to articles prepared therefrom.

Acrylonitrile has previously been used in the preparation of various polymers which are characterized by insolubility, or very low solubility in many of the common volatile organic solvents. For example, polyacrylonitrile has had only limited use because of its poor solubility, excessive hardness, brittleness and very high softening point. Fibers produced from polyacrylonitrile or from copolymers containing high percentages of acrylonitrile are further characterized by their poor affinities for organic dyes such as acid wool dyes, direct cotton dyes, insoluble vat dyes and cellulose acetate dyes, it being well known that fibers spun from polyacrylonitrile solutions can be passed through such dye baths without material amounts of the dye being taken up by the fiber.

Numerous attempts have been made to increase the dyeability of polyacrylonitrile fibers by interpolymerizing acrylonitrile with certain monomers whose polymers have an affinity for dyes. While this procedure does give polymer products from which fibers having good dyeing properties can be obtained, a serious drawback arises in certain instances due to a substantial lowering of the softening point of the fiber. For example, while an interpolymer of acrylonitrile and acrylic acid, containing 80 per cent by weight of acrylonitrile and 20 per cent by weight of acrylic acid in the polymer molecule, can be drawn into fibers readily susceptible to dyes, the softening point of such fibers is too low for practical purposes, softening of the fibers being observed at about 150-170° C.

Another procedure employed to increase the dyeability of polyacrylonitrile fibers has been to mix the polyacrylonitrile, before spinning, with other polymeric materials which are dye-susceptible. This method likewise provides fibers having good dyeing properties. However, many of these fibers show a low softening point and, in addition, many show segmentation into their individual components along their horizontal axis. For example, fibers spun from solutions of mixtures of polyacrylonitrile and polyvinyl acetate are too low in softening temperature to be of practical value, and also are subject to the defect of segmentation. This is not surprising because it is generally known that polyacrylonitrile is not compatible with many polymeric organic compounds. Attempts to produce good fibers from solutions of mixtures of polyacrylonitrile and polymeric amides such as polyacrylamide, polymethacrylamide or their N-substituted derivatives have not been successful because such mixtures do not give stable homogeneous solutions, separation into two layers generally occuring in from 24–72 hours. Such solutions or dopes have no technical value because they would separate during storage and processing into fibers.

I have now found that difficultly-soluble acrylonitrile polymers which contain at least 70 per cent by weight of acrylonitrile units can advantageously be mixed in critical proportions with certain resinous interpolymers consisting of fumaric amide or an N-substituted fumaric amide copolymerized with vinyl acetate that are soluble in solvents commonly used for dissolving acrylonitrile polymers such as, for example, dimethyl formamide, dimethyl acetomide, diethyl formamide, gamma-butyrolactone, ethylene carbonate, ethylene cyanohydrin, mixed solvents such as 1 part dimethyl formamide -2 parts acetonitrile, 1 part butyrolactone -2 parts of acetonitrile, etc., to give stable homogeneous solutions and compositions. Fibers produced from such compositions retain not only all the desirable properties of acrylonitrile polymers, but also show excellent dyeability by common types of acid wool dyes applied by standard methods and also show improved affinity for cellulose acetate dyes and for some types of vat dyes.

It is, accordingly, an object of the invention to provide polymer mixtures comprising polyacrylonitrile. A further object is to provide homogeneous solutions of these polymer mixtures comprising polyacrylonitrile. Still another object is to provide fibers of good dyeability from those homogeneous solutions of these polymer mixtures. Other objects will become apparent hereinafter.

In accordance with my invention, I prepare the composite, resinous compositions of my invention by dissolving from 70 to 92 parts by weight of an acrylonitrile polymer and from 30 to 8 parts by weight of an interpolymer of fumaric amide or N-substituted fumaric amide with vinyl acetate, but preferably from 75 to 85 parts by weight of acrylonitrile polymer and 25 to 15 parts by weight of the said interpolymer, in one or more of the mentioned solvents. The solutions thus obtained are clear, smooth dopes that show no tendency to separate or turn cloudy after 2 days or longer standing. Fibers can be spun from such dopes by either wet or dry spinning methods. The concentration of the polymers in the solvent can vary widely from very low to very high concentrations, but for efficient operations the concentration is advantageously from 5 to 25 per cent, but preferably about 14-15 per cent of polymers in the solvent composition. The dopes are stable over the usual temperature range of spinning operations.

The acrylonitrile polymers employed in the invention can be 100 per cent polyacrylonitrile or they can be copolymers containing 70 per cent or more by weight of acrylonitrile. Suitable copolymers of acrylonitrile with unsaturated compounds containing a single ethylenic unsaturation, $CH_2=C<$, include acrylonitrile-vinyl acetate, acrylonitrile-vinyl chloride, acrylonitrile-methyl acrylate, and the like. An especially valuable acrylonitrile polymer is one containing from 80-90 per cent by weight of acrylonitrile and from 20—10 per cent by weight of isopropenyl acetate.

The fumaric amide or N-substituted fumaric amide polymers employed in the invention are interpolymers of vinyl acetate and an amide having the general formula:

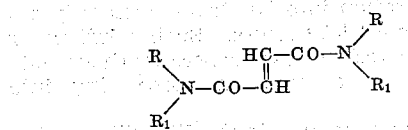

wherein R and $R_1$ each represent an atom of hydrogen, an alkyl group containing from 1 to 6 carbon atoms, a hydroxyalkyl group containing from 1 to 6 carbon atoms or a phenyl group, but wherein R and $R_1$ on each amide nitrogen contain together not more than a total of 6 carbon atoms. The preferred amide monomers include fumaric amide, and the N-methyl, N-ethyl, N-butyl, N,N'-dimethyl, N,N'-diethyl, N,N'-dipropyl, N,N'-diisopropyl, N,N'-dibutyl, N,N'-diisobutyl, N,N'-diamyl, N,N'-dihexyl, N,N'-diphenyl, N,N'-tetramethyl, N,N'-tetraethyl, N,N'-di(hydroxyethyl), etc. derivatives of fumaric amide. The fumaric amides can be prepared from fumaryl chloride and the appropriate amine. The polymerizations are carried out preferably by emulsion methods, but bead or suspension methods can also be used. Suitable emulsifying and suspending agents include fatty alcohol sulfates, aromatic sulfonates, soaps, gum arabic, polyvinyl alcohol, etc. Peroxide catalysts are preferred such as potassium persulfate, ammonium persulfate, benzoyl peroxide, acetyl peroxide, and the like, in an amount of from 0.1-1.2 per cent, based on the weight of monomers. Nonsolvents such as water can advantageously be employed for the interpolymerizations. The proportions of vinyl acetate and of the desired fumaric amide in the interpolymer can advantageously vary from 10 to 85 per cent by weight of vinyl acetate and from 90 to 15 per cent by weight of the fumaric amide, but preferably from 20 to 75 per cent vinyl acetate and from 80 to 25 per cent of the desired fumaric amide. The preferred interpolymers are, in general, soluble or highly swollen in water and are isolated by evaporation of the polymerization mixtures. The interpolymers containing more than 75 per cent of vinyl acetate can be isolated by precipitating them from the polymerization emulsions or suspensions with sodium sulfate.

The following examples will serve to illustrate further the new resinous composition of my invention and the manner of their preparation.

*Example 1.*—An interpolymer was prepared by polymerizing a mixture of 60 g. of vinyl acetate, 40 g. of N,N'-diethyl fumaric amide, 2 g. of sodium dodecyl sulfate, 0.6 g. of potassium persulfate and 900 cc. of water by heating at 50-60° C., with stirring for 20 hours. A viscous, semi-dope was obtained. This was evaporated on a steam bath to give a 90-95 per cent yield of hard, white resin. The resin was soluble in methyl or ethyl alcohol. It was also soluble in dimethyl formamide and in butyrolactone.

A spinning dope was prepared by dissolving 10 parts by weight of polyacrylonitrile and 3 parts by weight of the N,N'-diethyl fumaric amide-vinyl acetate interpolymer, prepared as above described, in 80 parts by weight of dimethyl formamide. The dope obtained was clear and smooth showing no tendency to separate on standing. The dope was extruded through a multi-hole spinnerette into a bath, consisting of 65 per cent water and 35 per cent dimethyl formamide. The filaments were washed with water, dried at 100-120° C. and passed through a steam chamber at 170-180° C. where they were drafted 600 per cent. The yarn tests showed a tensile strength of 4.0 grams per denier, an elongation of 18 per cent and excellent dye affinity for types of acid wool dyes, and improved dye affinity for cellulose acetate dyes and for some direct cotton dyes and insoluble vat dyes.

In place of the interpolymer of vinyl acetate and N,N'-diethyl fumaric amide in the above example, there can be substituted a like amount of an interpolymer of vinyl acetate and N,N'-dimethyl fumaric amide, prepared by a similar polymerization process, to give in admixture with polyacrylonitrile solutions and compositions which yield good fibers of excellent dyeing properties with acid wool dyes and cellulose acetate dyes and for some direct cotton dyes and insoluble vat dyes.

*Example 2.*—A spinning dope was prepared by dissolving 100 g. of an interpolymer consisting of 87 per cent by weight of acrylonitrile and 13 per cent by weight of isopropenyl acetate, and 25 g. of the interpolymer of N,N'-diethyl fumaric amide-vinyl acetate prepared as in Example 1, in 750 g. of dimethyl acetamide. The dope was spun as described in Example 1. The fibers obtained showed a tensile strength of 3.6 grams per denier and 25 per cent elongation. The fibers were readily dyed by acid wool dyes and cellulose acetate dyes.

*Example 3.*—An interpolymer was prepared by polymerizing a mixture of 50 g. of vinyl acetate, 50 g. of N,N'-diisopropyl fumaric amide, 2 g. of sodium dodecyl sulfate, 0.5 g. of ammonium persulfate and 1000 cc. of water, by heating at a temperature of 55-60° C., with stirring, for a period of 24 hours. The emulsion was evaporated in a vacuum at 50-60° C. to give a 90-95 per cent yield of hard, white resin. The resin was soluble in ethanol.

A spinning dope was prepared by dissolving 10 parts by weight of polyacrylonitrile and 3.2 parts by weight of the N,N'-diisopropyl fumaric amide-vinyl acetate interpolymer, prepared as above described, in 75 parts by weight of gamma-butyrolactone. The dope obtained was clear and smooth and remained stable after 3 days standing. It was extruded into a spinning bath consisting of 70 per cent tertiary butyl alcohol and 30 per cent of water. After washing and drafting, the fibers showed a tensile strength of 3 g. per denier and an elongation of 17 per cent. The fibers showed good affinity for acid wool dyes and for cellulose acetate dyes. An alternative extruding process is to extrude the dope solution through a spinnerette into a heated atmosphere of air or steam.

*Example 4.*—An interpolymer was prepared by polymerizing a mixture of 50 g. of vinyl acetate, 50 g. of N,N'-dibutyl fumaric amide, 2 g. of sodium oleyl sulfate, 0.6 g. of potassium persulfate and 1000 cc. of water, by heating the mixture at 60° C., with stirring, for a period of 20 hours. The polymer was coagulated by adding sodium sulfate to the polymerization emulsion. It was then washed and dried to give a yield of 90–92 per cent of interpolymer having proportions of vinyl acetate and N,N'-dibutyl fumaric amide present in substantially the same proportions as the proportions of monomers in the starting mixture. This resin was found to be compatible with 100 per cent polyacrylonitrile and with most interpolymers containing at least 75 per cent or more of acrylonitrile. When mixed in the amount of 16 to 24 parts by weight of the resin to from 84 to 76 parts by weight of acrylonitrile polymer, the compositions were soluble in the mentioned solvents such as dimethyl formamide, dimethyl acetamide, gamma-butyrolactone, etc.

The spinning of fibers from the solutions or dopes of the invention can be carried out by the usual wet spinning methods employing aqueous spinning baths or baths of organic liquids such as the lower alcohols (methanol, ethanol, etc.). Dry spinning or evaporative methods can also be used. Although some of the fumaric amide polymers employed in the composite, resinous composition are soluble in water, they are not appreciably leached from the fiber during the spinning and washing operations apparently because their molecular weights are high enough to prevent diffusion through the composite composition. Fibers prepared according to the invention can be dyed to dark shades with the common types of acid wool dyes using standard methods. The fibers also show good affinity for cellulose acetate dyes and for some vat dyes. In addition, the solutions or dopes of the composite, resinous compositions of the invention, with or without added fillers, pigments, dyes, plasticizers, etc., can also be coated on film-forming surfaces to give flexible and tough films and sheet materials.

What we claim is:

1. A resinous composition consisting of a mixture of from 70 to 92 parts by weight of a polymer containing at least 70 per cent by weight of acrylonitrile, and from 30 to 8 parts by weight of an interpolymer consisting of from 10 to 85 per cent by weight of vinyl acetate and from 90 to 15 per cent by weight of a fumaric amide having the general formula:

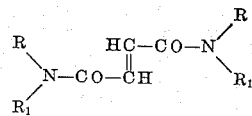

wherein R and R₁ each represent a member selected from the group consisting of an atom of hydrogen, an alkyl group containing from 1 to 6 carbon atoms, a hydroxyalkyl group containing from 1 to 6 carbon atoms and a phenyl group and wherein the R and R₁ on each amide nitrogen contain together not more than a total of 6 carbon atoms.

2. A resinous composition consisting of a mixture of from 70 to 92 parts by weight of polyacrylonitrile and from 30 to 8 parts by weight of an interpolymer consisting of from 10 to 85 per cent by weight of vinyl acetate and from 90 to 15 per cent by weight of an N,N'-dialkyl fumaric amide wherein each alkyl group contains from 1 to 6 carbon atoms.

3. A resinous composition consisting of a mixture of from 75 to 85 parts by weight of polyacrylonitrile and from 25 to 15 parts by weight of an interpolymer consisting of from 20 to 75 per cent by weight of vinyl acetate and from 80 to 25 per cent by weight of an N,N'-dialkyl fumaric amide wherein each alkyl group contains from 1 to 6 carbon atoms.

4. A resinous composition consisting of a mixture of from 75 to 85 parts by weight of polyacrylonitrile and from 25 to 15 parts by weight of an interpolymer consisting of from 20 to 75 per cent by weight of vinyl acetate and from 80 to 25 per cent by weight of N,N'-diethyl fumaric amide.

5. A resinous composition consisting of a mixture of from 75 to 85 parts by weight of polyacrylonitrile and from 25 to 15 parts by weight of an interpolymer consisting of from 20 to 75 per cent by weight of vinyl acetate and from 80 to 25 per cent by weight of N,N'-diisopropyl fumaric amide.

6. A resinous composition consisting of a mixture of from 75 to 85 parts by weight of polyacrylonitrile and from 25 to 15 parts by weight of an interpolymer consisting of from 20 to 75 per cent by weight of vinyl acetate and from 80 to 25 per cent by weight of N,N'-dibutyl fumaric amide.

7. A resinous composition consisting of a mixture of from 75 to 85 parts by weight of polyacrylonitrile and from 25 to 15 parts by weight of an interpolymer consisting of from 20 to 75 per cent by weight of vinyl acetate and from 80 to 25 per cent by weight of N,N'-dimethyl fumaric amide.

8. A resinous composition consisting of a mixture of from 75 to 85 parts by weight of an acrylonitrile polymer consisting of from 80 to 90 per cent by weight of acrylonitrile and the remainder of the polymer of isopropenyl acetate, and from 25 to 15 parts by weight of an interpolymer consisting of from 20 to 75 per cent by weight of vinyl acetate and from 80 to 25 per cent by weight of N,N'-diethyl fumaric amide.

9. A solution of a resinous composition consisting of a mixture of from 70 to 92 parts by weight of a polymer containing at least 70 per cent by weight of acrylonitrile, and from 30 to 8 parts by weight of an interpolymer consisting of from 10 to 85 per cent by weight of vinyl acetate and from 90 to 15 per cent by weight of fumaric amide having the general formula

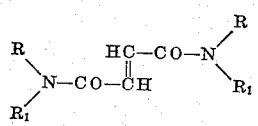

wherein R and R₁ each represent a member selected from the group consisting of an atom of hydrogen, an alkyl group containing from 1 to 6 carbon atoms, a hydroxyalkyl group containing from 1 to 6 carbon atoms, and a phenyl group, and wherein the R and R₁ on each amide nitrogen contain together not more than a total of 6 carbon atoms, in a solvent selected from the group consisting of dimethyl formamide, dimethyl acetamide, diethyl formamide, gamma-butyrolactone, ethylene carbonate, ethylene cyanohydrin, a mixture of 1 part dimethyl formamide and 2 parts acetonitrile and a mixture of 1 part butyrolactone and 2 parts acetonitrile.

10. A solution of a resinous composition consisting of a mixture of from 70 to 92 parts by weight of polyacrylonitrile and from 30 to 8 parts by weight of an interpolymer consisting of from 10 to 85 per cent by weight of vinyl acetate and from 90 to 15 per cent by weight of an N,N'-dialkyl fumaric amide wherein each alkyl group contains from 1 to 6 carbon atoms, in dimethyl formamide.

11. A solution of a resinous composition consisting of from 75 to 88 parts by weight of polyacrylonitrile and from 25 to 15 parts by weight of an interpolymer consisting of from 20 to 75 per cent by weight of vinyl acetate and from 80 to 25 per cent by weight of an N,N'-dialkyl fumaric amide wherein each alkyl group contains from 1 to 6 carbon atoms, in gamma-butyrolactone.

12. A solution of a resinous composition consisting of a mixture of from 75 to 85 parts by weight of polyacrylonitrile and from 25 to 15 parts by weight of an interpolymer consisting of from 20 to 75 per cent by weight of vinyl acetate and from 80 to 25 per cent by weight of N,N'-diethyl fumaric amide, in dimethyl formamide.

13. A solution of a resinous composition consisting of a mixture of from 75 to 85 parts by weight of polyacrylonitrile and from 25 to 15 parts by weight of an interpolymer consisting of from 20 to 75 per cent by weight of vinyl acetate and 80 to 25 per cent by weight of N,N'-diisopropyl fumaric amide, in gamma-butyrolactone.

14. A solution of a resinous composition consisting of a mixture of from 75 to 85 parts by weight of polyacrylonitrile and from 25 to 15 parts by weight of an interpolymer consisting of from 20 to 75 per cent by weight of vinyl acetate and 80 to 25 per cent by weight of N,N'-dimethyl fumaric amide, in dimethyl formamide.

15. A solution of a resinous composition consisting of a mixture of from 75 to 85 parts by weight of an acrylonitrile polymer consisting of from 80 to 90 per cent by weight of acrylonitrile and the remainder of the polymer of isopropenyl acetate; and from 25 to 15 parts by weight of an interpolymer consisting of from 20 to 75 per cent by weight of vinyl acetate and from 80 to 25 per cent by weight of N,N'-diethyl fumaric amide, in dimethyl acetamide.

16. A solution of a resinous composition consisting of a mixture of from 75 to 85 parts by weight of polyacrylonitrile and from 25 to 15 parts by weight of an interpolymer consisting of from 20 to 75 per cent by weight of vinyl acetate and from 80 to 25 per cent by weight of N,N'-dibutyl fumaric amide, in dimethyl acetamide.

JOHN R. CALDWELL.

References Cited in the file of this patent

UNITED STATES PATENTS

| Number | Name | Date |
|---|---|---|
| 2,346,858 | Mighton | Apr. 18, 1944 |
| 2,404,714 | Latham | July 23, 1946 |
| 2,571,777 | Stanin et al. | Oct. 16, 1951 |